(12) United States Patent
Sato

(10) Patent No.: US 7,031,319 B2
(45) Date of Patent: Apr. 18, 2006

(54) ATM SWITCHING SYSTEM

(75) Inventor: Hiroaki Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 988 days.

(21) Appl. No.: 09/956,819

(22) Filed: Sep. 21, 2001

(65) Prior Publication Data

US 2002/0037009 A1 Mar. 28, 2002

(30) Foreign Application Priority Data

Sep. 22, 2000 (JP) .............................. 2000/288711

(51) Int. Cl.
*H04L 12/28* (2006.01)
*H04L 12/56* (2006.01)

(52) U.S. Cl. .................... 370/395.31; 370/219; 714/11
(58) Field of Classification Search ........... 370/395.31, 370/395.52, 219, 220; 714/11, 9, 10
See application file for complete search history.

(56) References Cited

U.S. PATENT DOCUMENTS

| | | | | |
|---|---|---|---|---|
| 5,303,243 A | * | 4/1994 | Anezaki | 714/13 |
| 5,708,654 A | * | 1/1998 | Arndt et al. | 370/242 |
| 6,032,266 A | * | 2/2000 | Ichinohe et al. | 714/9 |
| 6,049,825 A | * | 4/2000 | Yamamoto | 709/221 |
| 6,359,858 B1 | * | 3/2002 | Smith et al. | 370/217 |
| 6,594,227 B1 | * | 7/2003 | Ogawa et al. | 370/216 |
| 6,640,314 B1 | * | 10/2003 | Lelaure et al. | 714/11 |
| 6,810,010 B1 | * | 10/2004 | Matsukawa | 370/219 |
| 2003/0215231 A1 | * | 11/2003 | Weston-Dawkes et al. | 398/19 |

FOREIGN PATENT DOCUMENTS

| | | |
|---|---|---|
| JP | 4-127754 | 4/1992 |
| JP | 5-244164 | 9/1993 |
| JP | 6-46134 | 2/1994 |
| JP | 10-105424 | 4/1998 |
| JP | 10-135993 | 5/1998 |
| JP | 11-220486 | 8/1999 |

* cited by examiner

*Primary Examiner*—Ajit Patel
*Assistant Examiner*—Chirag Shah
(74) *Attorney, Agent, or Firm*—Young & Thompson

(57) ABSTRACT

An ATM switching system 10 includes an EMA 20 and CPUs 30 and 40 as currently acting and subsidiary systems, respectively. The CPUs 30 and 40 are connected via connecting lines 50a and 50b to a network 60. Each CPU 30 (or 40) includes a system controller 32 (or 42), a MAC/IP address controller 33 (or 43) and a MAC/IP address setter 34 (or 44). Each MAC/IP address controller 33 (or 43) has a MAC/IP address management table 35 (or 45) for managing MAC, IP and other kinds of addresses, and outputs a MAC/IP address retrieval result according to the MAC/IP address retrieval caused by it.

5 Claims, 8 Drawing Sheets

FIG.8
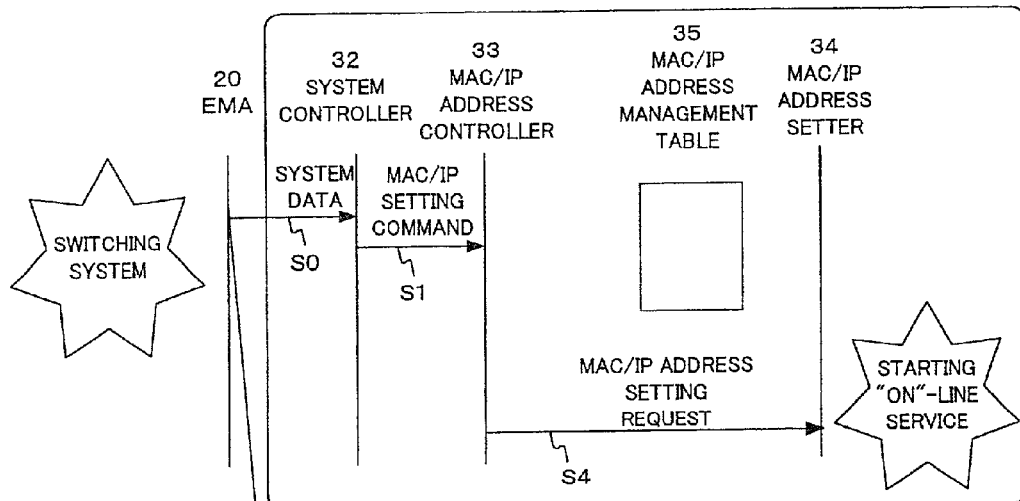
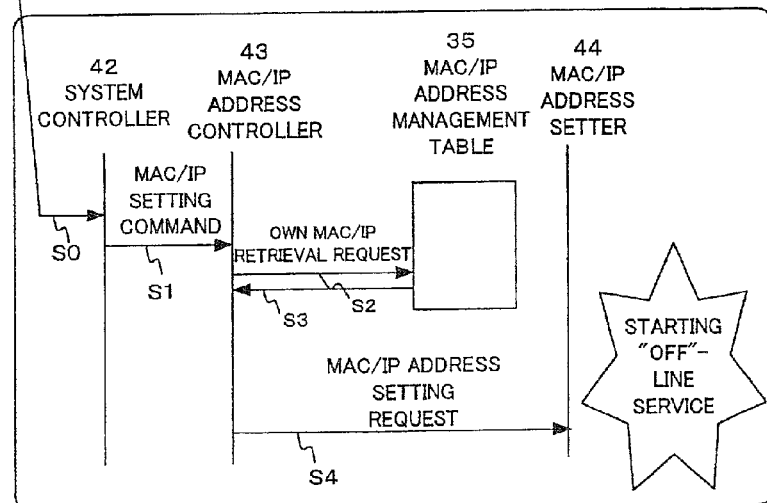

ATM SWITCHING SYSTEM

BACKGROUND OF THE INVENTION

This application claims benefit of Japanese Patent Application No. 2000-288711 filed on Sep. 22, 2000, the contents of which are incorporated by the reference. The present invention relates to asynchronous transfer mode (ATM) switching systems and, more particularly, to ATM switching systems including pluralities of MAC and IP addresses.

As prior art concerning such ATM switching systems, for instance, Japanese Patent Laid-Open No. 11-220486 discloses "Router System Doubling Method", and Japanese Patent Laid-Open No. 10-105424 discloses "Method of IP Address Assignment by Doubling Server". As an example of the former method, two router systems, i.e., a currently acting (ACT) system and a subsidiary (SBY) system, are connected to the same LAN. In addition, the ACT and SBY systems are interconnected by a separate line from the LAN to permit monitoring of trouble in the subsidiary router system via the separate line. In the event of trouble take-over of the MAC and IP addresses is performed between the subsidiary and currently acting systems to enable continual communication.

However, the above prior art has the following problem. Where the MAC and IP address are assigned to the ACT and SBY CPUs and EMA (emergency action circuit) which performs the system control when trouble occurs, different MAC and IP addresses are set for the ACT and SBY CPUs and the EMA, respectively, and these MAC and IP addresses are provided as those of the individual systems.

SUMMARY OF THE INVENTION

An object of the present invention, accordingly, is to provide an ATM switching system, which determines a single MAC address and a single IP address among the pluralities of MAC and IP addresses at the "on"-line service time.

Another object of the present invention is to provide an ATM switching system, which provides the MAC and IP addresses of the individual constituent systems at the "off"-line service time.

According to an aspect of the present invention, there is provided an ATM switching system to be connected to a network comprising at least two CPUs operable in states of currently acting (ACT), subsidiary acting (SBY), on-line or off-line, and an emergency action unit (EMA) for controlling the operations of CPUs, wherein the CPU includes the steps of; judging whether the CPU is in the state of on-line or off-line on the basis of system data provided from the emergency action unit and including at least currently acting (ACT), subsidiary acting (SBY), on-line and off-line; judging whether the CPU is in the state of currently acting or subsidiary acting; retrieving a predetermined representative MAC/IP address from a MAC/IP address managing table including MAC/IP addresses to be set and setting the retrieved representative MAC/IP address when the CPU is in the state of currently acting and on-line; retrieving an own MAC/IP address from the MAC/IP address managing table and setting the retrieved own MAC/IP address when the representative MAC/IP address has not been retrieved; stopping a service to the network when the CPU is in the state of subsidiary acting; and retrieving the own MAC/IP from a MAC/IP address managing table and setting the retrieved own MAC/IP address when the CPU is in the state of off-line, and starting the service to the network.

The system data further includes single operation, double operation, independent operation of the CPU. The MAC/IP addresses in the MAC/IP address management system further include a plurality of other MAC/IP addresses for other units. The currently acting and subsidiary CPUs are connected by connecting lines to a network such as Ethernet.

According to another aspect of the present invention, there is provided an ATM switching system comprising a plurality of constituent systems each having pluralities of media access control (MAC) addresses and internet protocol (IP) addresses and connected to a network, wherein: a single MAC address and a single IP address to be provided as addresses of an ATM switching system to the outside are determined by retrieval of a MAC/IP address management table including MAC/IP addresses to be set, based on system data including at least currently acting (ACT), subsidiary acting (SBY), on-line and of off-line.

According to other aspect of the present invention, there is provided an ATM switching system comprising a plurality of constituent systems each including an emergency action circuit (EMA) for outputting system data including at least currently acting (ACT), subsidiary acting (SBY), on-line and off-line, a currently acting system CPU and a subsidiary system CPU, wherein: the currently acting and subsidiary system CPUs each have a system controller for outputting a MAC/IP address setting command by analyzing the system data from the EMA, a MAC/IP address controller for controlling the MAC/IP address on the basis of the address setting command, and a MAC/IP address management table for receiving a MAC/IP address retrieval result from the MAC/IP address controller and outputting the MAC/IP address retrieval result to the MAC/IP address controller, and a MAC/IP address setter for providing a service to the network by receiving the MAC/IP address setting request from the MAC/IP address controller.

Other objects and features will be clarified from the following description with reference to the attached drawings.

BRIEF DESCRIPTION OF THE DRAWINGS

FIG. 8 is a sequence diagram showing the processing at the time of the switching of the ACT side over to the SBY die due to trouble occurrence.

PREFERRED EMBODIMENTS OF THE INVENTION

Preferred embodiments of the present invention will now be described with reference to the drawings.

Figure 1:
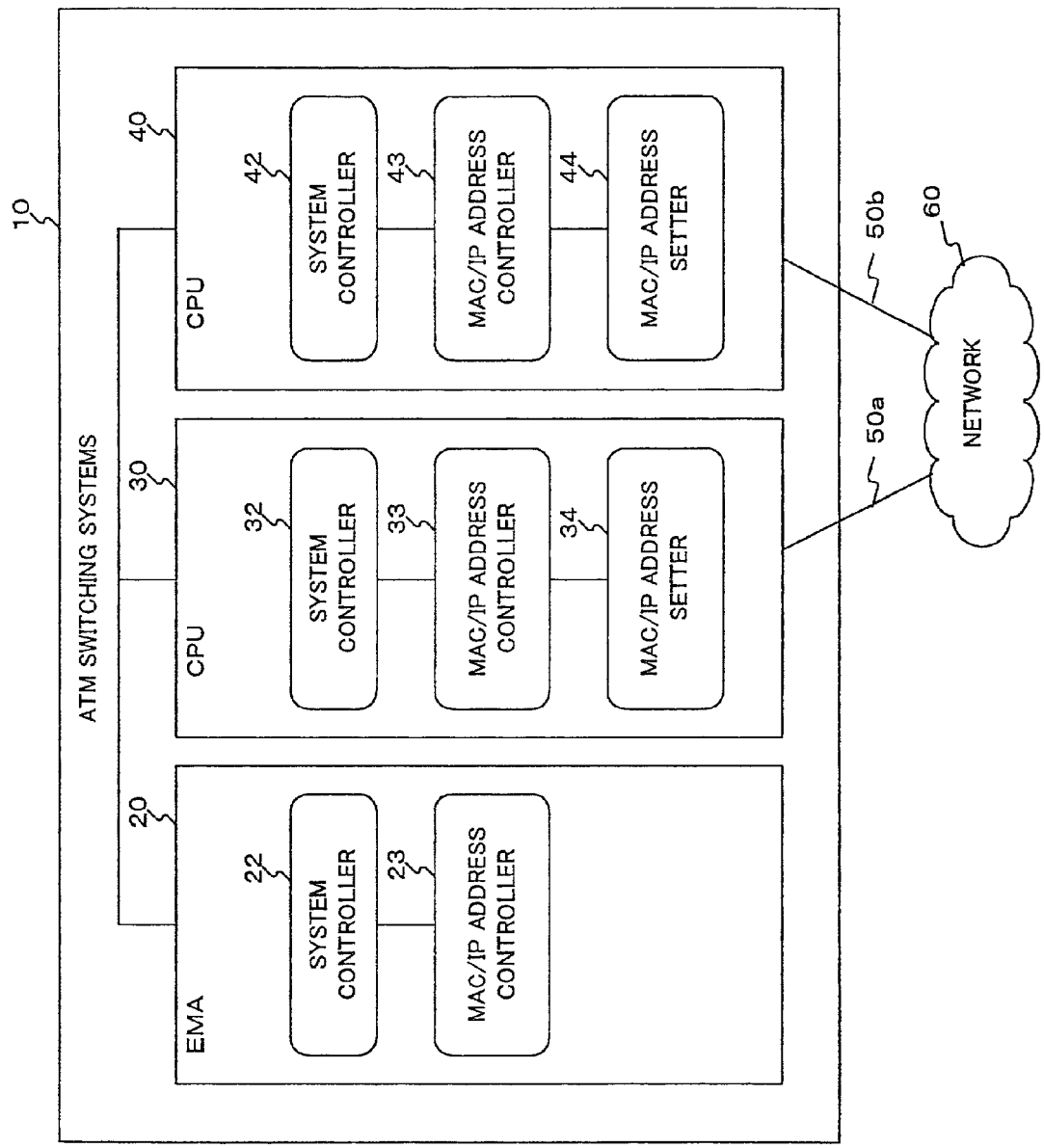
FIG. 1 is a functional block diagram showing a preferred embodiment of the ATM switching system according to an embodiment of the present invention.

FIG. 1 is a functional block diagram showing a preferred embodiment of the ATM switching system according to the present invention. As an example, an ATM switching system 10 connected to a network 60 such as Ethernet. The ATM switching system 10 comprises an emergency action circuit (EMA) 20 and a first and a second central processing unit (CPU) 30 and 40. The EMA 20 includes a system controller 22 and MAC/IP address controller 23. The first CPU 30 includes a system controller 32, MAC/IP address controller 33 and MAC/IP setter 34. As will be described later with reference to FIG. 2, the MAC/IP address controller 33(43) includes MAC/IP address management table 35(45). Likewise, the second CPU 40 includes a system controller 42, MAC/IP address controller 43 and MAC/IP address setter 44. As will be described later with reference to FIG. 2, each MAC/IP address controller 33 (43) has a MAC/IP address management table 35 (45). The first and second CPUs 30 and 40 are connected by connecting lines 50a and 50b, respectively, to network 60.

Figure 2:
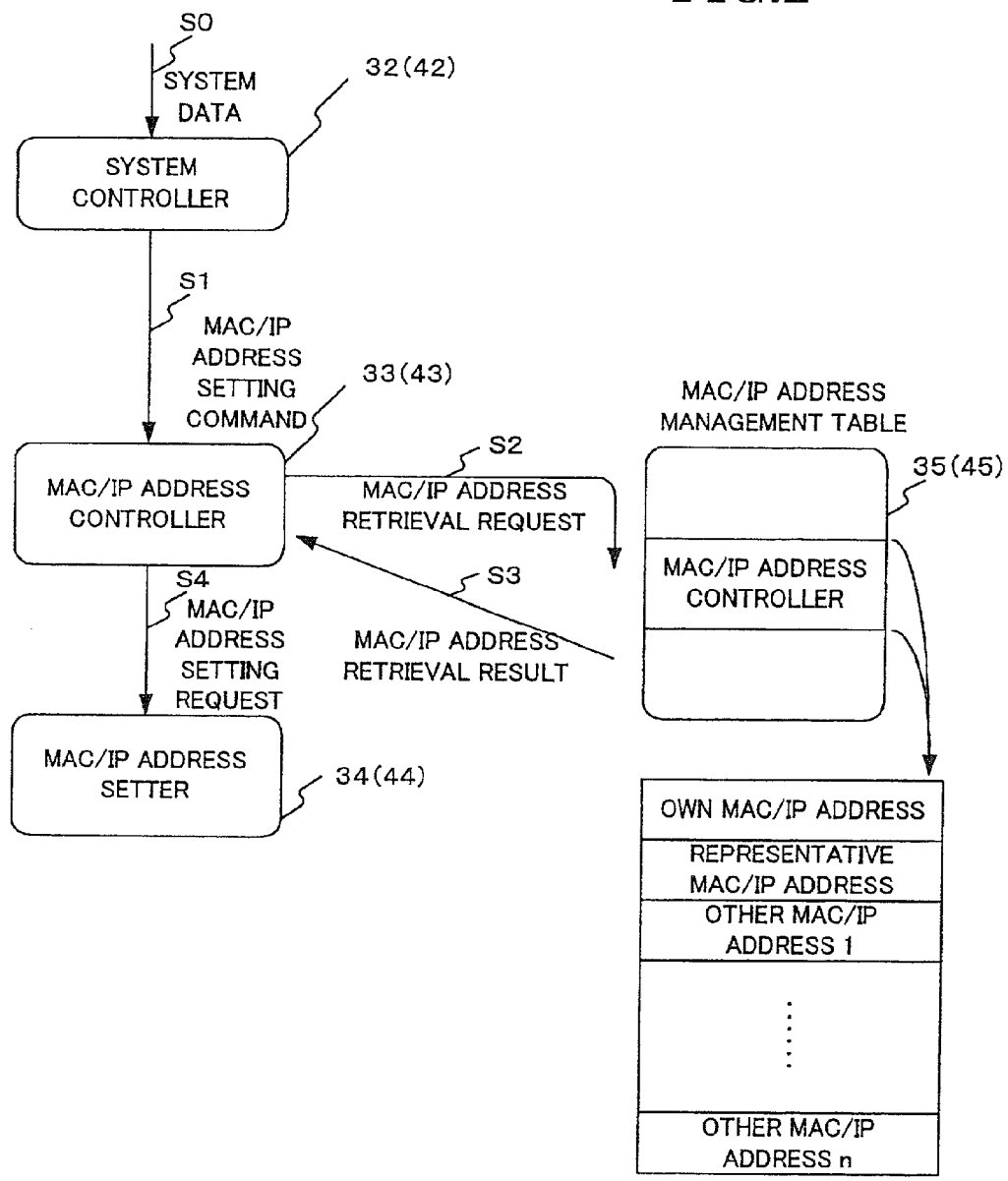
FIG. 2 shows the first (or second) CPU 30 (or 40) shown in FIG. 1.

FIG. 2 shows the first (or second) CPU 30 (or 40) shown in FIG. 1. As described before, the CPU 30 (or 40) includes the system controller 32 (or 42), the MAC/IP address controller 33 (43) and the MAC/IP address setter 34 (or 44). System data S0 which represents the system operation information is inputted to the system controller 32 (or 42), which in turn outputs an MAC/IP address setting command S1 to the MAC/IP address controller 33 (or 43). The MAC/IP address controller 33 (or 43) also outputs MAC/IP address setting request S4 to the MAC/IP address setter 34 (or 44).

The MAC/IP address management table 35 (or 45) in the MAC/IP address controller 33 (or 43) manages such data as MAC and IP addresses and address kinds (e.g., own, representative, and other addresses "1" to "n"). Specifically, as shown in FIG. 2, the MAC/IP address provided in the MAC/IP address management table 35 (or 45) each include own MAC/IP address, representative MAC/IP address and other MAC/IP addresses "1" to "n". The MAC/IP address controller 33 (43) outputs an MAC/IP address retrieval request S2 to the MAC/IP address management table 35 (or 45). The MAC/IP address controller 33 (or 43) also receives a MAC/IP address retrieval result S3 from the MAC/IP address management table 35 (or 45).

The operation of this system will now be described with reference to FIGS. 1 and 2. The EMA 20 sends out system data S0 including at least currently acting (ACT), subsidiary acting (SBY), on-line, off-line, single operation, double operation, and independent operation of the CPU to the first and second CPUs 30 and 40. Each system controller 32 (or 42) judges MAC/IP address to be set by analyzing the received system data S0, and then sends out an MAC/IP address setting command S1 to the controller 33 (or 43). The MAC/IP address controller 33 (43) receiving the MAC/IP address setting command S1, retrieves the MAC/IP address management table 35 (or 45) on the basis of the content of the command, that is, it sends out an MAC/IP address retrieval request S2 to the MAC/IP address management table 35 (or 45). In this way, the controller 33 (or 43) dictates derivation of the MAC/IP address to be set, and receives an MAC/IP address retrieval result S3. The controller 33 (or 43) then outputs an MAC/IP address setting request S4 to the MAC/IP address setter 34 (44). Then, a service to the network (such as Ethernet) 60 is started via the connecting line 50a (or 50b).

Figure 3:
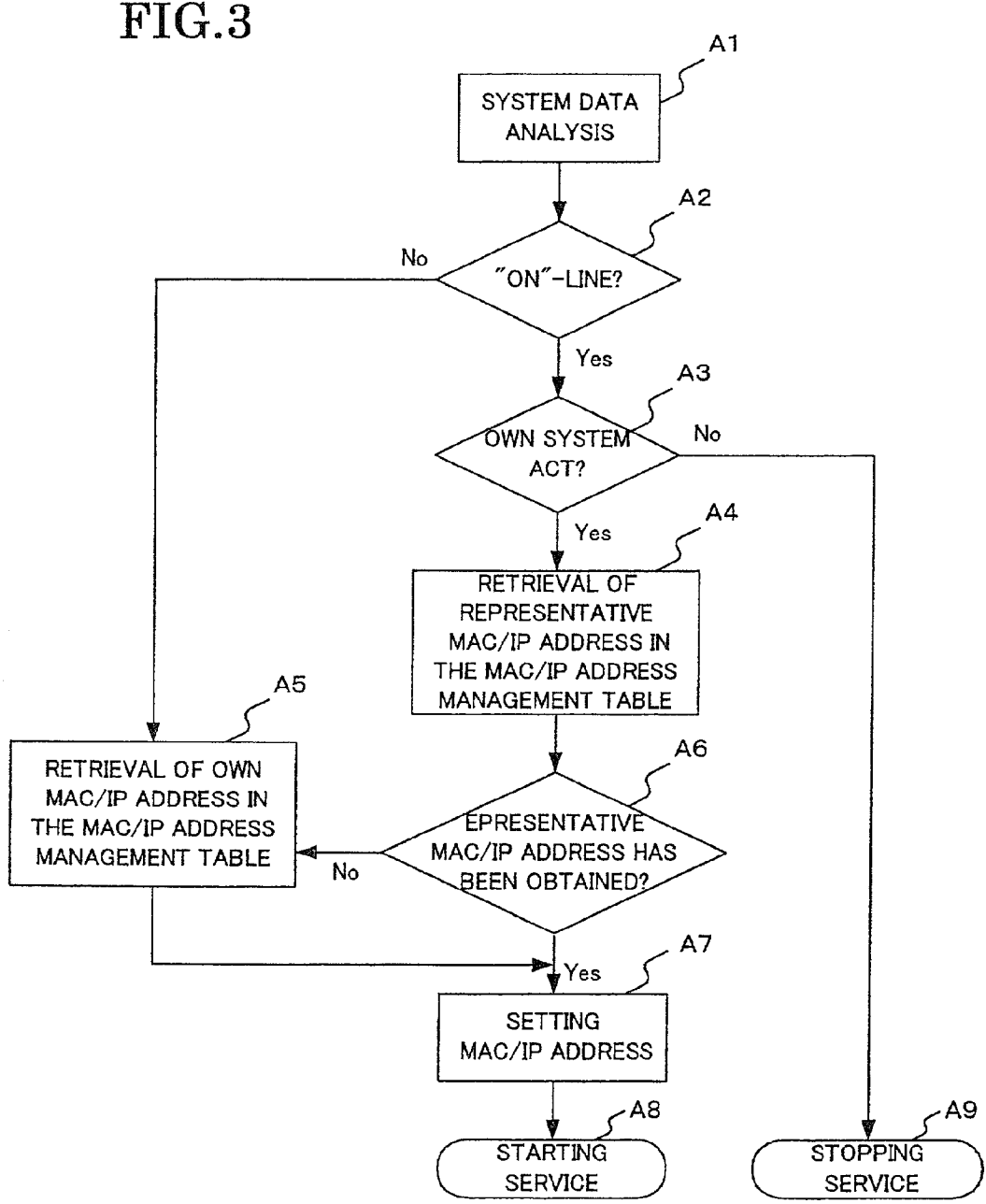
FIG. 3 is a flow chart illustrating the overall operation of the ATM switching system shown in FIGS. 1 and 2 according to the present invention.

FIG. 3 is a flow chart illustrating the overall operation of the ATM switching system shown in FIGS. 1 and 2 according to the present invention. In the processing in the system as the currently acting (or ACT) side system, the first CPU 30 receiving the system data S0 from the EMA 20 executes system data analysis (step A1). In step A2, it is judged as to whether the system data S0 indicates "on"-line. The first CPU 30 then checks whether the own system is the ACT side system (step A3). When the own system is the ACT side system ("Yes" in step A3), the first CPU 30 causes retrieval of representative MAC/IP address in the MAC/IP address management table 35 (step A4). The first CPU 30 then checks whether the representative MAC/IP address has been obtained (step A6). When the representative MAC/IP address has been obtained ("Yes" in step A6), the first CPU 30 sets the MAC/IP address (system A7). Then, the service to the network (such as Ethernet) 60 is started via the connecting line 50a (step A8). On the other hand, when the representative MAC/IP address is not determined ("No" in step A6), that is, when the MAC/IP address has not been set yet, the own MAC/IP address is set (step A7). Then, the service to the network (such as Ethernet) 60 is started via the connecting line 50a (step A8).

When the own system is the subsidiary (or SBY) side system, the first CPU 30 receiving the system data S0 from the EMA 20 executes the system data analysis (step A1). The first CPU 30 then checks whether the "on"-line service is in force (step A2). When the "on"-line service is in force, in step A3 since the own system is the SBY system in this case, the service to the network (such as Ethernet) 60 is stopped via the connecting line 50a (step A9).

The processing when the "off"-line service is as follows. When the first CPU 30 receives the system data S0 from the EMA 20, it also executes the system data analysis (step A1), and then executes the check as to whether the "on"-line service is in force (step A2). Since the "off"-line service is in force, the first CPU 30 then causes the own MAC/IP address retrieval in the MAC/IP address management table 35 (or 45) (step A5). Then, the first CPU 30 sets the retrieved own MAC/IP address (step A7) for starting the service (step A8).

Figure 4:
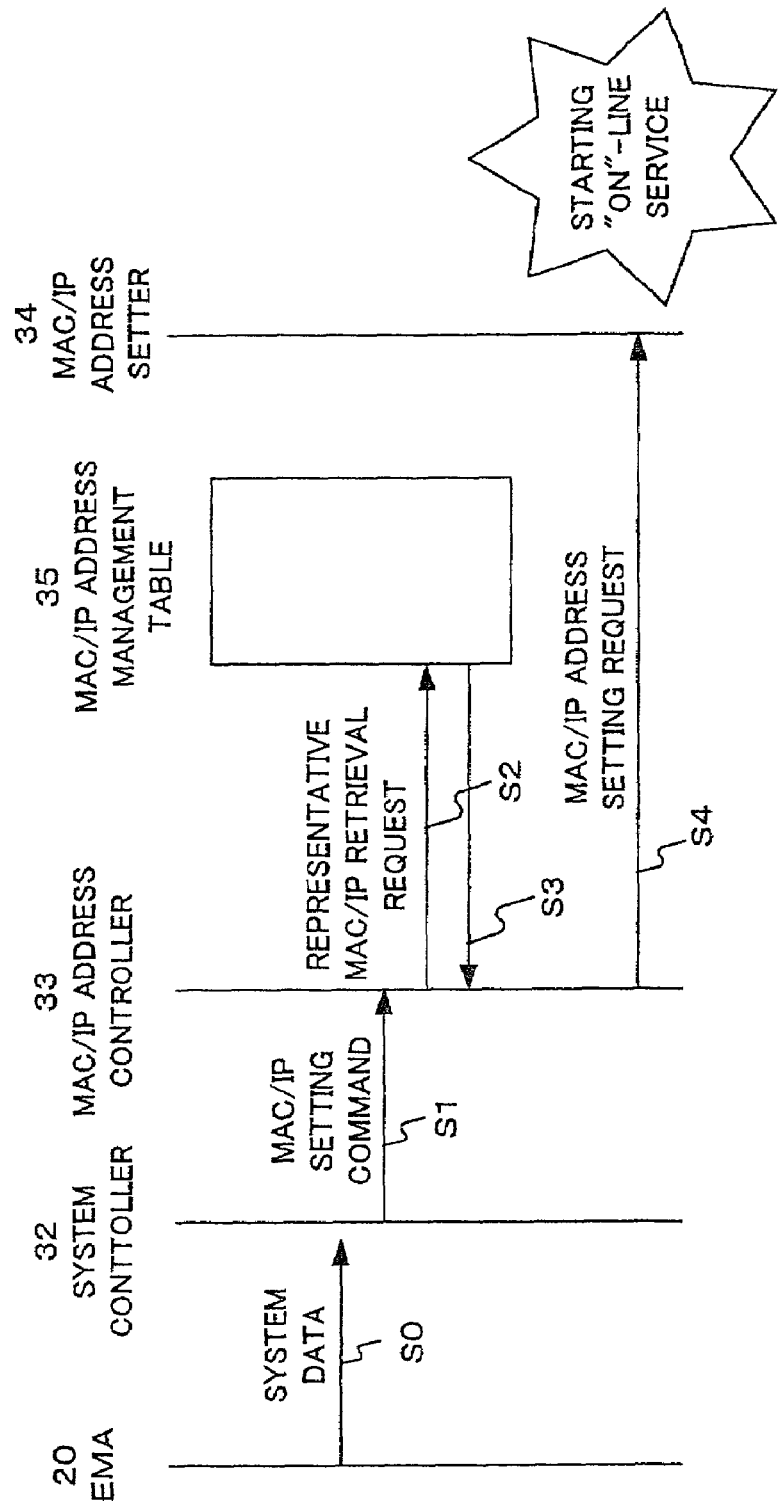
FIG. 4 is a sequence diagram showing the ACT side processing in the ATM switching system according to the present invention.

Operation examples of the preferred embodiment shown in FIG. 1 according to the present invention will now be described. FIG. 4 is a sequence diagram showing the ACT side processing in the ATM switching system according to the present invention. When the system controller (or system data analyzer) 32 receives the system data S0 from the EMA 20, it analyzes the system data S0. Thus, the system controller 32 determines MAC/IP address to be set, and outputs the MAC/IP address setting command S1 to the MAC/IP address controller 33. The MAC/IP address controller 33 receiving the MAC/IP address setting command S1 sends out a retrieval request S2 to the MAC/IP address management table 35 according to the content of the command, and thus obtains pertinent MAC/IP address S3. The MAC/IP address controller 33 then sends out the MAC/IP address setting request S4 to the MAC/IP address setter 34 for starting the "on"-line service.

Figure 5:
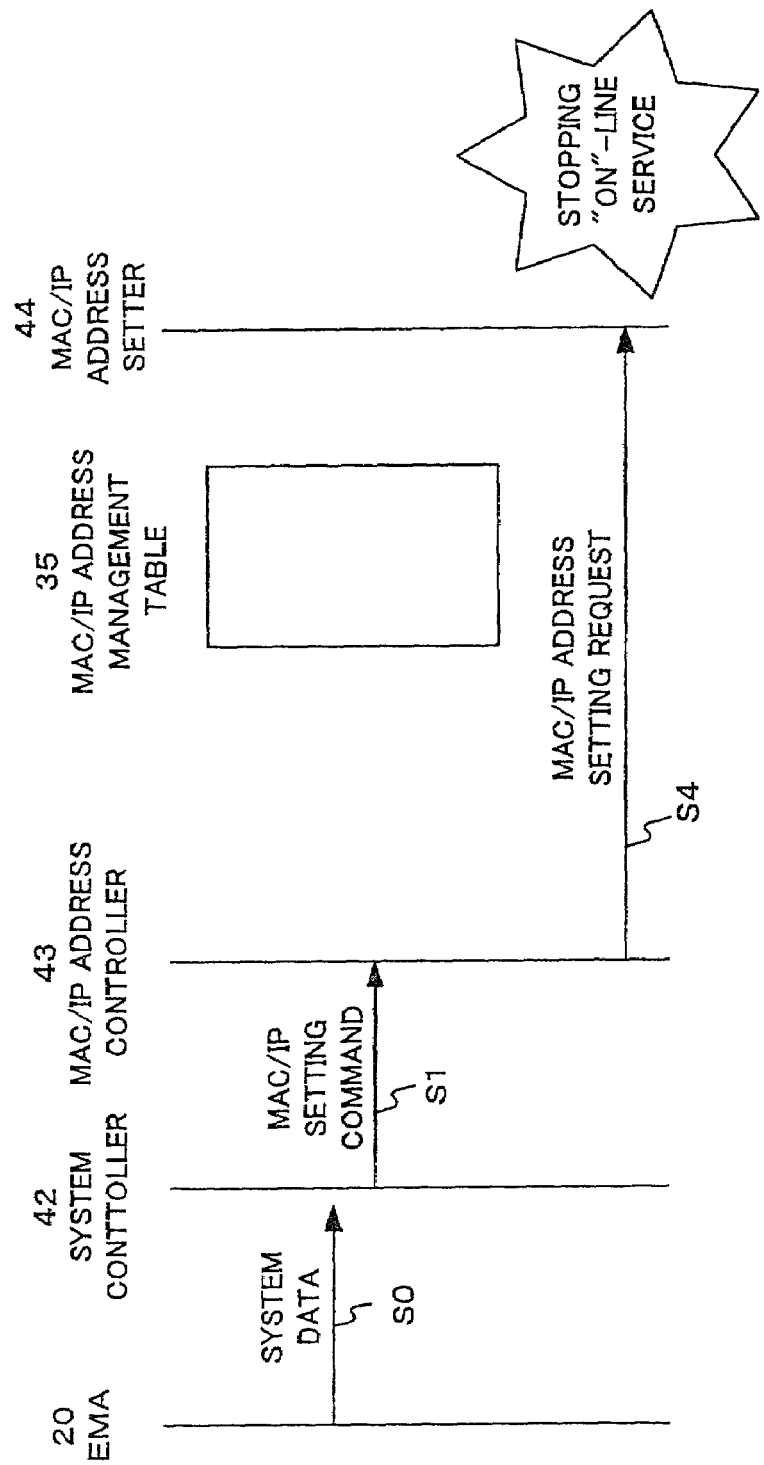
FIG. 5 is a sequence diagram of the SBY side processing in the ATM switching system according to the present invention.

FIG. 5 is a sequence diagram of the SBY side processing in the ATM switching system according to the present invention. When the system controller (i.e., system data analyzer) 42 receives the system data S0 from the EMA 20, it analyzes the system data S0. Then, the system controller 42 determines MAC/IP address to be set, and outputs the MAC/IP address setting command S1 to the MAC/IP address controller 43. The MAC/IP address controller 43 receiving the MAC/IP address setting command S1 does not cause retrieval of the MAC/IP address management table 45 according to the content of the command (because of the SBY side command). Instead, the MAC/IP address controller 43 outputs a MAC/IP address setting request S4 to the MAC/IP address setter 44 for stopping the "on"-line service. Here the reason why the retrieval from the MAC/IP address managing table is not executed is that if MAC/IP address is set on the SBY side, two MAC/IP addresses, that is, those on the ACT and SBY sides are both exist.

Figure 6:
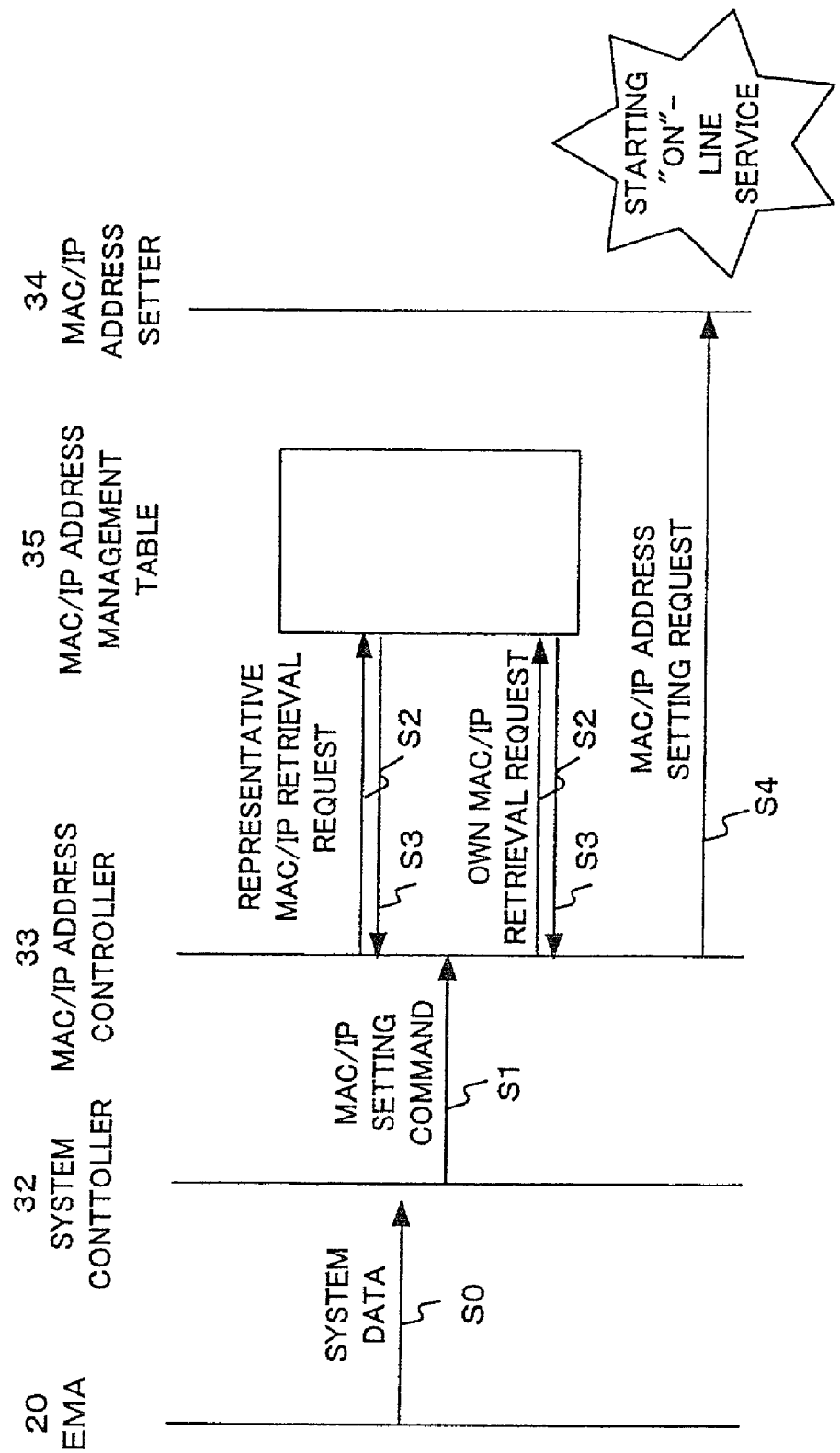
FIG. 6 is a sequence diagram showing the processing in the event of failure of obtaining representative MAC/IP address.

FIG. 6 is a sequence diagram showing the processing in the event of failure of obtaining representative MAC/IP address. This situation is caused due to the destruction of the MAC/IP address managing table or that the representative MAC/IP address has not been set. When the system controller (i.e., system data analyzer) 32 receives the system data S0 from the EMA 20, it analyzes the system data S0. Then, the system controller 32 determines MAC/IP address to be set, and outputs the MAC/IP address setting command S1 to the MAC/IP address controller 33. The MAC/IP address controller 33 receiving the MAC/IP address setting command S1 sends out the retrieval request S2 to the MAC/IP address management table 35 according to the content of the command, and obtains the pertinent MAC/IP address S3. In the event of failure of obtaining the pertinent MAC/IP address, the MAC/IP obtains the own MAC/IP address afresh (S2 and S3). When it obtains the pertinent MAC/IP address, the MAC/IP address controller 33 sends out the MAC/IP address setting request S4 to the MAC/IP address setter 34 for starting the "on"-line service.

Figure 7:
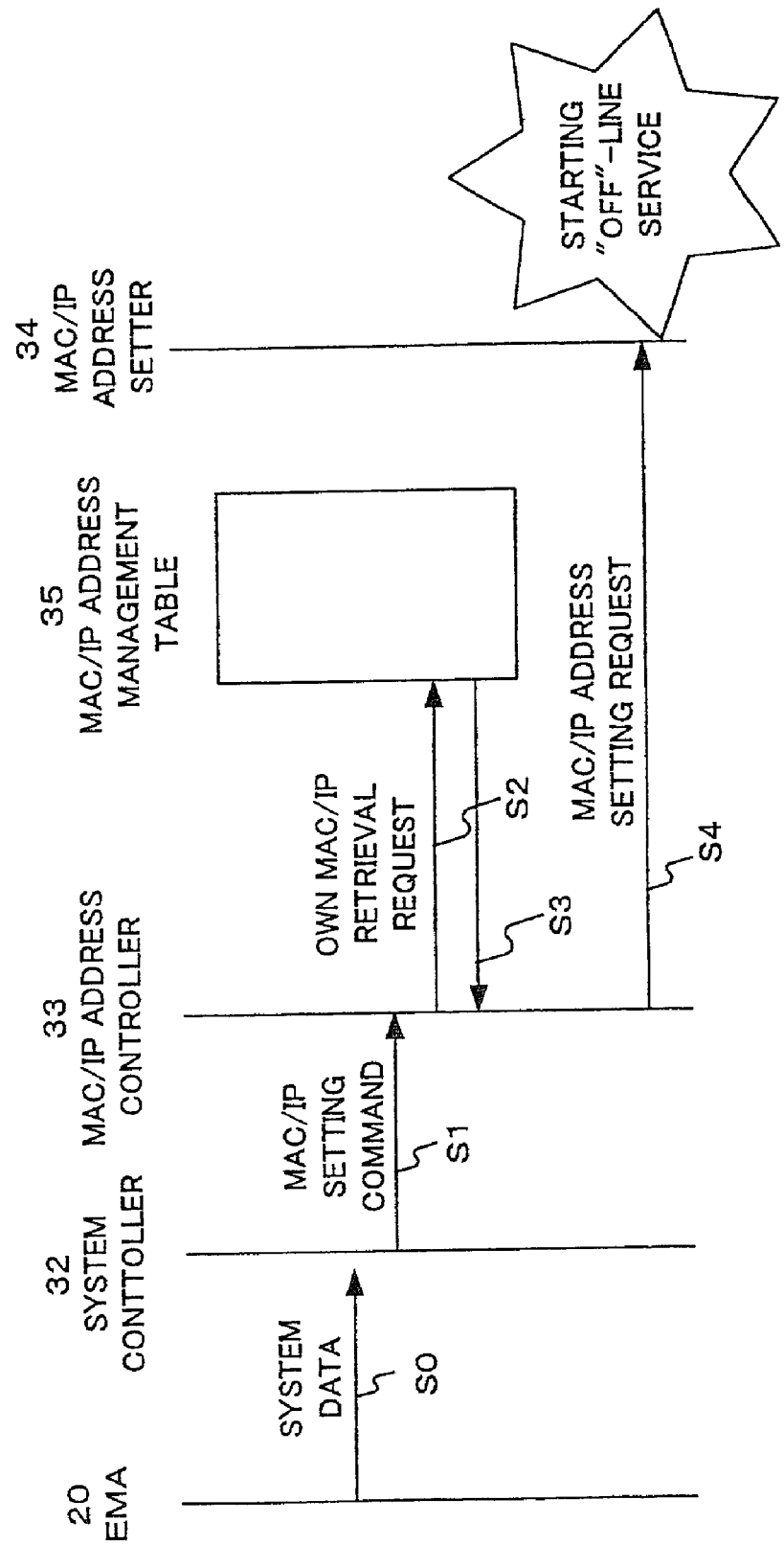
FIG. 7 is a sequence diagram showing the processing when the "off"-line service is in force. When the system controller (i.e., system data analyzer) 32 receives the system data S0 from the EMA S0, it analyses the system data S0)

FIG. 7 is a sequence diagram showing the processing when the "off"-line service is in force. When the system controller (i.e., system data analyzer) 32 receives the system data S0 from the EMA S0, it analyses the system data S0). Then, the system controller 32 determines the MAC/IP address to be set, and outputs the MAC/IP address setting command S1 to the MAC/IP address controller 33. The MAC/IP address controller 33 receiving the MAC/IP address setting command S1 sends out the retrieval request S2 to the MAC/IP address management table 35 according to the content of the command, and thus obtains the own MAC/IP address S3. The MAC/IP address controller 33 then sends out the MAC/IP address setting request S4 to the MAC/IP address setter 34 for starting the "off"-line service.

FIG. 8 is a sequence diagram showing the processing at the time of the switching of the ACT side over to the SBY die due to trouble occurrence. In the new SBY side system, the system controller (i.e., system data analyzer) 32 receiving the system data S0 from the EMA 20 analyzes the system data S0. Then, the system controller 32 determines the MAC/IP address to be set, and outputs the MAC/IP address setting command S1 to the MAC/IP address controller 33. The MAC/IP address controller 33 receiving the MAC/IP address setting command S1 does not cause retrieval of the MAC/IP address management table 35 (because of the SBY side command). Instead, the MAC/IP address controller 33 outputs the MAC/IP address request S4 to the MAC/IP address setter 34 for stopping the "on"-line service (change in status from the ACT to the SBY side system).

Also, in the new ACT side system the system controller (i.e., system data analyzer) 42 receiving the system data S0 from the EMA 20 analyzes the system data S0. Then, the system controller 42 determines the MAC/IP address to be set, and outputs the MAC/IP address setting command S1 to the MAC/IP address controller 43. The MAC/IP address controller 43 receiving the MAC/IP address setting command S1 causes retrieval of the MAC/IP address management table 35 according to the content of the command, and thus obtains own MAC/IP address (since the command has been given during the "off"-line service). Then, the MAC/IP address controller 43 sends out the own MAC/IP address setting request S4 to the MAC/IP address setter 44 and also the MAC/IP address setting request S4 thereto for starting the "off"-line service (change in status from the SBY to the ACT side system).

As has been described in the foregoing, with the ATM switching system the following practically pronounced advantages are obtainable. Firstly, even where the constituent systems such as the EMA and CPU systems of the ATM switching system each have pluralities of MAC and IP addresses, only a single MAC address and a single IP address can be determined as addresses of an ATM switching system for providing the service. This is so because the system controller and the MAC/IP address controller in each CPU obtain MAC and IP addresses of the own CPU with retrieval of the MAC/IP address management table for providing the service with different MAC and IP addresses from those in the"on"-line service. This operation is brought about in order that, while providing all the call processing services in the "on"-line service, in the "off"-line service the different MAC and IP addresses are used for connection to the network and service provision to enable file updating and other engineer-directed services (such as maintenance operations).

Secondly, at the "off"-line time it is possible to provide service with the different MAC and IP addresses from those at the "on"-line time. This is so because the system controller and MAC/IP address controller retrieve the MAC/IP address management table, obtain the own CPU MAC address and IP address to enable the service with the different MAC address and IP address from those of "on"-line time.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An ATM switching system to be connected to a network comprising at least two CPUs operable in state of currently acting (ACT), subsidiary acting (SBY), on-line or off-line, and an emergency action unit (EMA) for controlling the operations of CPUs, wherein the CPU includes steps of:
  judging whether the CPU is in the state of on-line or off-line on the basis of system data provided from the emergency action unit and including at least currently acting (ACT), subsidiary acting (SBY), on-line and off-line;
  judging whether the CPU is in the state of currently acting or subsidiary acting;
  retrieving a predetermined representative MAC/IP address from a MAC/IP address managing table including MAC/IP addresses to be set and setting the retrieved representative MAC/IP address when the CPU is in the state of currently acting and on-line;
  retrieving an own MAC/IP address from the MAC/IP address managing table and setting the retrieved own MAC/IP address when the representative MAC/IP address has not been retrieved;

stopping a service to the network when the CPU is in the state of subsidiary acting; and retrieving the own MAC/IP from the MAC/IP address managing table and setting the retrieved own MAC/IP address when the CPU is in the state of off-line, and starting the service to the network.

2. The ATM switching system according to claim 1, wherein the system data further includes single operation, double operation, independent operation of the CPU.

3. The ATM switching system according to claim 1, wherein the MAC/IP addresses in the MAC/IP address management system further include a plurality of other MAC/IP addresses for other units.

4. The ATM switching system according to claim 1, wherein the presently acting and subsidiary CPUs are connected by connecting lines to a network.

5. An ATM switching system comprising a plurality of constituent systems each including an emergency action circuit (EMA) for outputting system data including at least currently acting (ACT), subsidiary acting (SBY), on-line and off-line, a presently acting system CPU and a subsidiary system CPU, wherein:

the presently acting and subsidiary system CPUs each having a system controller for outputting a MAC/IP address setting command by analyzing the system data from the EMA, a MAC/IP address controller for controlling the MAC/IP address on the basis of the address setting command, and a MAC/IP address management table for receiving a MAC/IP address retrieval result from the MAC/IP address controller and outputting the MAC/IP address retrieval result to the MAC/IP address controller, and a MAC/IP address setter for providing a service to the network by receiving the MAC/IP address setting request from the MAC/IP address controller.

* * * * *